(12) United States Patent
Yao et al.

(10) Patent No.: US 11,460,392 B2
(45) Date of Patent: Oct. 4, 2022

(54) NON-CONTACT FIBER PERMEABILITY MEASUREMENT SYSTEM AND METHOD THEREOF

(71) Applicant: NATIONAL TSING HUA UNIVERSITY, Hsinchu (TW)

(72) Inventors: Yuan Yao, Hsinchu (TW); Cheng-Yi Yang, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 474 days.

(21) Appl. No.: 16/671,185

(22) Filed: Nov. 1, 2019

(65) Prior Publication Data
US 2020/0363309 A1 Nov. 19, 2020

(30) Foreign Application Priority Data
May 13, 2019 (TW) .................................. 108116454

(51) Int. Cl.
*G01N 15/08* (2006.01)
(52) U.S. Cl.
CPC ................................ *G01N 15/0806* (2013.01)
(58) Field of Classification Search
CPC .... G01N 15/00; G01N 15/08; G01N 15/0806; G01N 27/22
See application file for complete search history.

(56) References Cited

U.S. PATENT DOCUMENTS

| | | | | |
|---|---|---|---|---|
| 4,187,327 A | * | 2/1980 | Lapp | H01G 4/22 29/25.42 |
| 4,856,320 A | * | 8/1989 | Bose | G01N 27/221 73/30.01 |
| 4,907,442 A | * | 3/1990 | Jones | G01N 27/221 324/698 |
| 4,994,751 A | * | 2/1991 | Cook | A61B 10/0045 600/584 |
| 5,682,102 A | * | 10/1997 | Takahashi | G01R 31/34 324/545 |

(Continued)

FOREIGN PATENT DOCUMENTS

| | | | | |
|---|---|---|---|---|
| CN | 104897541 A | | 9/2015 | |
| DE | 10004146 A1 | * | 7/2000 | ........... G01N 27/221 |

(Continued)

*Primary Examiner* — Nguyen Q. Ha
(74) *Attorney, Agent, or Firm* — CKC & Partners Co., LLC

(57) ABSTRACT

A non-contact fiber permeability measurement system includes a mold device, a fluid supplying device, a capacitance detecting device and a permeability converting device. The mold device includes an upper plate, a lower plate and a fluid inlet. The lower plate is parallel to and disposed below the upper plate for forming an accommodating space disposing a measured fibrous fabric insulated against the upper plate and the lower plate. The fluid inlet is disposed through the upper plate. The fluid supplying device is connected to the mold device and for providing a fluid perfused from the fluid inlet into the accommodating space. The capacitance detecting device is electrically connected to the upper plate and the lower plate. The permeability converting device is electrically connected to the capacitance detecting device and for receiving the capacitance detected via the capacitance detecting device to convert the capacitance to a permeability.

13 Claims, 5 Drawing Sheets

(56) References Cited

U.S. PATENT DOCUMENTS 6,510,358 B1     1/2003   Schattauer et al.
7,999,561 B2 *   8/2011   Uozumi ............. B29C 53/8066
                                                                   324/686

FOREIGN PATENT DOCUMENTS

| | | |
|---|---|---|
| DE | 10004146 A1 | 7/2000 |
| DE | 102006038679 A1 | 2/2008 |
| JP | 2007139447 A | 6/2007 |
| TW | 201804146 A | 2/2018 |

* cited by examiner

NON-CONTACT FIBER PERMEABILITY MEASUREMENT SYSTEM AND METHOD THEREOF

RELATED APPLICATIONS

This application claims priority to Taiwan Application Ser. No. 108116454, filed May 13, 2019, which is herein incorporated by reference.

BACKGROUND

Technical Field

The present disclosure relates to fiber permeability measurement system and method thereof. More particularly, the present disclosure relates to non-contact fiber permeability measurement system and method thereof.

Description of Related Art

In recent years, fiber-reinforced resin-matrix composite materials are widely applied to military, transportation, electronic supplies and building materials with vigorous development of high-performance composite industry. In the fiber-reinforced resin-matrix composite materials, resin transfer molding (RTM) is widely researched and applied owing to low cost and a characteristic of excellent product performance. In a process of RTM, a ratio of a permeability to a porosity is the key factor of a pre-woven fiber.

For a method of permeability measurement, a plurality of measurement systems have been developed and a governing equation of resin flow procedure is established based on Darcy's law. In prior art, a wavefront of a fluid is recorded via a high speed camera. However, the wavefront of a resin is difficult to be differentiated when the pre-woven fiber is disposed in a nontransparent mold or the color of the fluid is similar to the color of the pre-woven fiber. Furthermore, in a contact measurement system, a capacitance cannot be generated owing to a capacitor conductive with an electrode, such as a carbon fiber with conductivity. Hence, the application is limited.

SUMMARY

According to one aspect of the present disclosure, a non-contact fiber permeability measurement system includes a mold device, a fluid supplying device, a capacitance detecting device and a permeability converting device. The mold device includes an upper plate, a lower plate and a fluid inlet. The lower plate is parallel to and disposed below the upper plate for forming an accommodating space, wherein the accommodating space is for disposing a measured fibrous fabric, and the measured fibrous fabric is insulated against the upper plate and the lower plate. The fluid inlet is disposed through the upper plate. The fluid supplying device is connected to the mold device and for providing a fluid to be perfused from the fluid inlet into the accommodating space. The capacitance detecting device is electrically connected to an outer surface of the upper plate and an outer surface of the lower plate and for detecting a capacitance of the accommodating space. The permeability converting device is electrically connected to the capacitance detecting device and for receiving the capacitance to convert the capacitance to a permeability.

According to another aspect of the present disclosure, a non-contact fiber permeability measurement method includes a preparing step, a perfusing step and a permeability converting step. In the preparing step, a measured fibrous fabric is disposed in an accommodating space formed between an upper plate and a lower plate, and the measured fibrous fabric is insulated against the upper plate and the lower plate, respectively. In the perfusing step, a fluid is perfused into the accommodating space, and a capacitance of the fluid is detected via a capacitance detecting device electrically connected to an outer surface of the upper plate and an outer surface of the lower plate. In the permeability converting step, the capacitance is received from the perfusing step and the capacitance is converted to a permeability via a permeability converting device.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
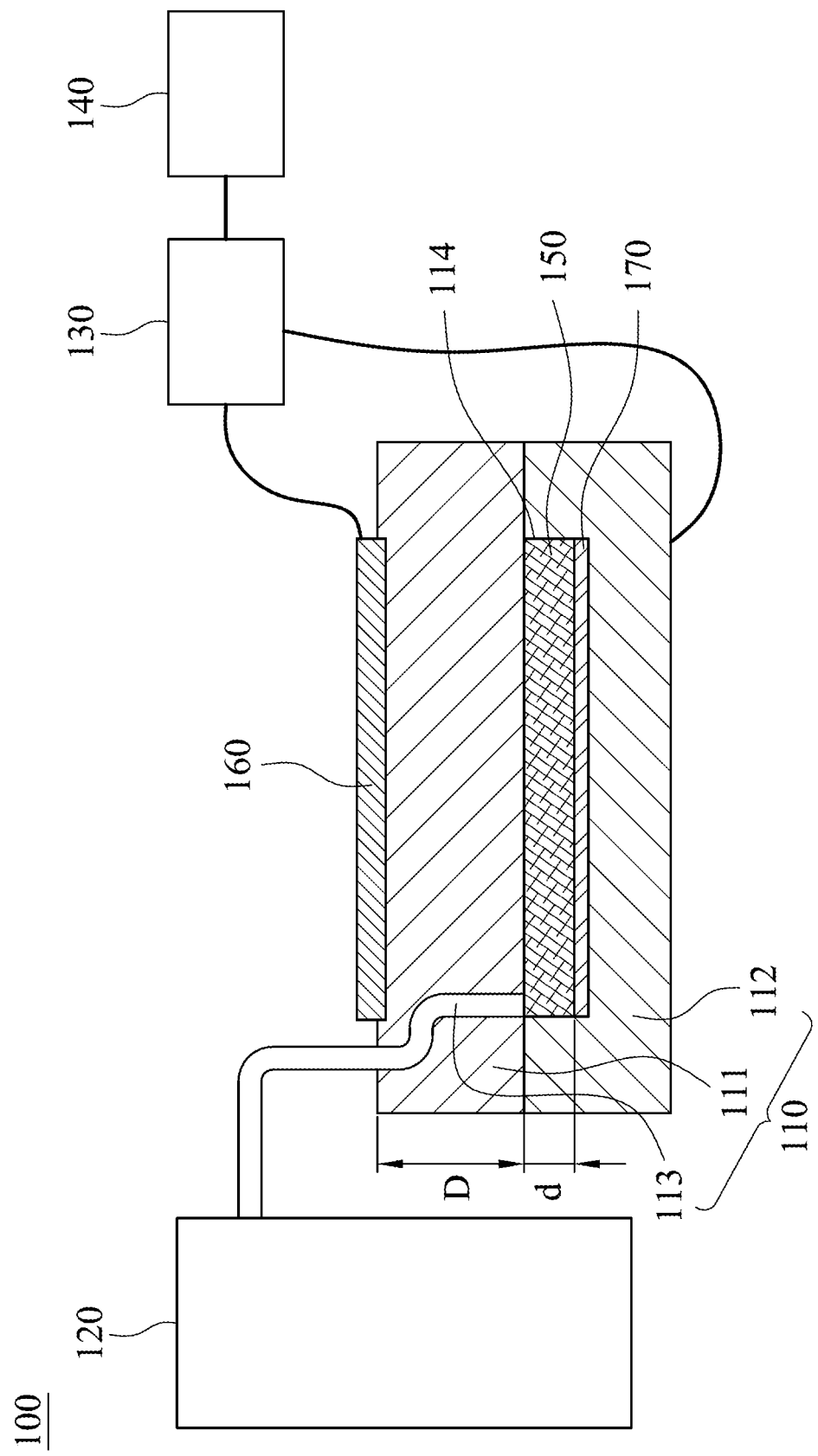
FIG. 1 is a disposition schematic view of a non-contact fiber permeability measurement system according to an embodiment of the present disclosure.

FIG. 1 shows a disposition schematic view of a non-contact fiber permeability measurement system 100 according to an embodiment of the present disclosure. In FIG. 1, the non-contact fiber permeability measurement system 100 includes a mold device 110, a fluid supplying device 120, a capacitance detecting device 130 and a permeability converting device 140. The mold device 110 includes an upper plate 111, a lower plate 112 and a fluid inlet 113. The lower plate 112 is parallel to and disposed below the upper plate 111 for forming an accommodating space 114, wherein the accommodating space 114 is for disposing a measured fibrous fabric 150, and the measured fibrous fabric 150 is insulated against the upper plate 111 and the lower plate 112. The upper plate 111 has a thickness of the upper plate D, and the accommodating space 114 has a thickness of the accommodating space d. The fluid inlet 113 is disposed through the upper plate 111. The measured fibrous fabric 150 can be any fiber whose porosity and dielectric constant are known, such as a carbon fiber or a glass fiber. The fluid supplying device 120 is connected to the mold device 110 and for providing a fluid to be perfused from the fluid inlet 113 into the accommodating space 114. Furthermore, the fluid can be any fluid whose viscosity is known, such as a resin. The capacitance detecting device 130 is electrically connected to an outer surface of the upper plate 111 and an outer surface of the lower plate 112 and for detecting a capacitance of the accommodating space 114, wherein the capacitance detecting device 130 can include a measurement software, such as LabVIEW software. The permeability converting device 140 is electrically connected to the capacitance detecting device 130 and for receiving the capacitance to convert the capacitance to a permeability, wherein the permeability converting device 140 can include an analysis software, such as MATLAB software, for converting the capacitance to the permeability. Therefore, the measured fibrous fabric 150 is insulated against the mold device 110, so that whether the measured fibrous fabric 150 is conductive or insulated, the measured fibrous fabric 150 can be measured via the non-contact fiber permeability measurement system 100. Moreover, the damage of the capacitance detecting device 130 via the fluid can be avoided during the measurement process because of the non-contact property, so that the non-contact fiber permeability measurement system 100 can be used to measure a fiber perfused via a high pressure fluid and a conductive fiber perfused via the fluid. Therefore, the non-contact fiber permeability measurement system 100 can be more widely used.

Furthermore, at least one of the upper plate 111 and the lower plate 112 can be made of a metal material or an insulating material. The at least one of the upper plate 111 and the lower plate 112 made of the metal material can further include an insulating layer 170 for being insulated against the measured fibrous fabric 150, wherein the insulating layer 170 can be an insulating plate disposed on a side of the at least one of the upper plate 111 and the lower plate 112 made of the metal material toward the accommodating space 114; or the insulating layer 170 can an insulating membrane formed on a side of the at least one of the upper plate 111 and the lower plate 112 made of the metal material toward the accommodating space 114. The at least one of the upper plate 111 and the lower plate 112 made of the insulating material can further include a conducting plate 160 electrically connected to the capacitance detecting device 130. In detail, according to the embodiment of FIG. 1, the upper plate 111 is made of the insulating material, such as an acrylic material, and the lower plate 112 is made of the metal material. The measured fibrous fabric 150 must be insulated against the upper plate 111 and the lower plate 112, so that the lower plate 112 further includes the insulating layer 170, and the lower plate 112 made of the metal material is insulated against the measured fibrous fabric 150 via the insulating layer 170. In FIG. 1, the insulating layer 170 can be the insulating plate, and the insulating plate can be made of a plastic material. The upper plate 111 and the lower plate 112 must be electrically connected to the capacitance detecting device 130, so that the upper plate 111 further includes a conducting plate 160. The conducting plate 160 can be a copper plate, but is not limited thereto. Therefore, the upper plate 111 is electrically connected to the capacitance detecting device 130 via the conducting plate 160. Moreover, in FIG. 1, the upper plate 111 is made of a transparent acrylic material, so that a perfusing condition during a perfusing step can be directly observed, and the observation during the perfusing step is mentioned in the following embodiment.

Figure 2:
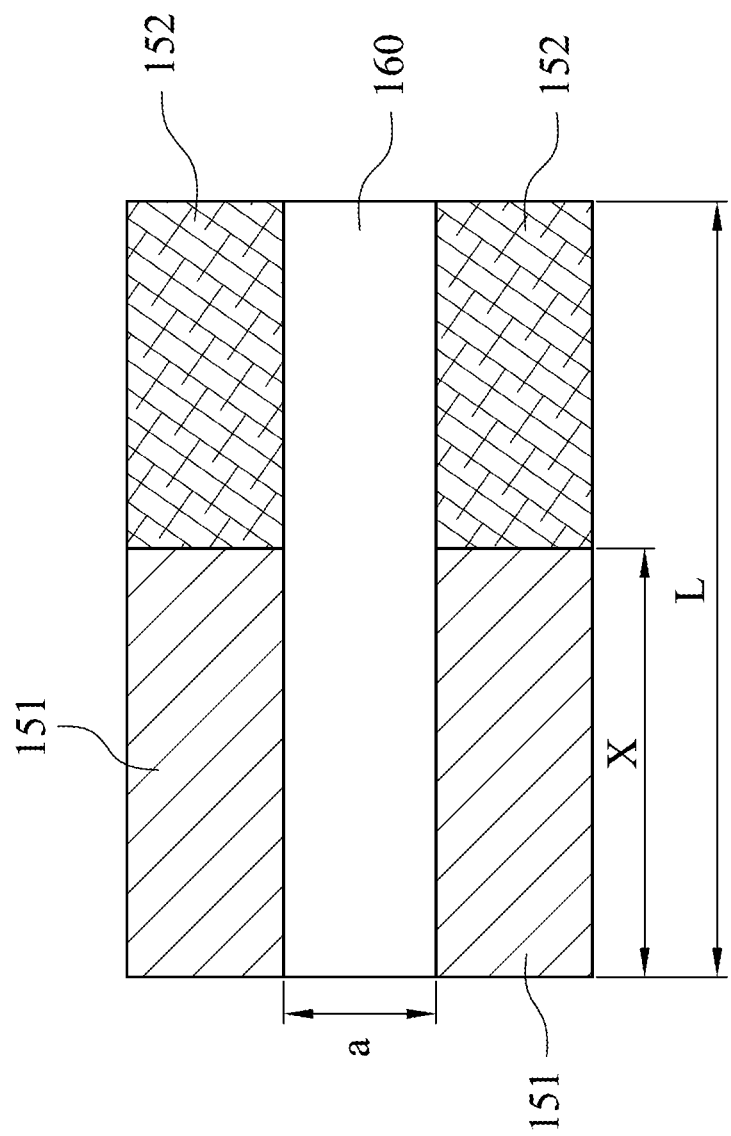
FIG. 2 is a top view for showing the fluid perfused into the accommodating space according to the embodiment of FIG. 1.

In FIG. 1, the fluid inlet 113 can be connected to a side of the accommodating space 114, and the fluid inlet 113 is for the fluid being perfused from the side of the accommodating space 114 into the other side of the accommodating space 114. FIG. 2 shows a top view for showing the fluid perfused into the accommodating space 114 according to the embodiment of FIG. 1. In FIG. 2, a middle area is the conducting plate 160 attached above the upper plate 111. The upper plate 111 is made of the transparent acrylic material, so that a perfusing condition of the fluid perfused into the accommodating space 114 can be observed from top side. After being perfused via the fluid, in FIG. 2, a slash part at the left side of the accommodating space 114 is a perfused area 151 of the measured fibrous fabric 150 mixed with the fluid, and the right side of the accommodating space 114 according to the embodiment of FIG. 2 is an unperfused area 152 of the measured fibrous fabric 150 unmixed with the fluid. The conducting plate 160 has a width of the conducting plate a, the measured fibrous fabric 150 has a length of the accommodating space L, and the perfused area 151 has a wavefront length of the fluid X. The width of the conducting plate a and the length of the accommodating space L can be set according to the actual disposition. Therefore, the capacitance received from the capacitance detecting device 130 is converting to the permeability via the permeability converting device 140.

A principle of the conversion of the permeability will be mentioned according to FIGS. 1 and 2. A relationship of a seepage velocity and a velocity of Darcy's law is derived by the principle of conservation of mass. The measured fibrous fabric 150 is a porous material, so that the velocity of Darcy's law is different from the real flowing rate, and a factor of a porosity of the measured fibrous fabric 150 must be considered. The seepage velocity is inversely proportional to the fiber porosity of the measured fibrous fabric 150, as the following formula (1):

$$u_f = \frac{u}{\phi}, \tag{1}$$

wherein $u_f$ is the seepage velocity, u is the velocity of Darcy's law, and $\phi$ is the fiber porosity of the measured fibrous fabric 150. Therefore, the seepage velocity is substituted into Darcy's law, and Darcy's law is supposed to be pseudo-steady state, as the following formula (2):

$$X^2 = \frac{2K \cdot P_0 \cdot t}{\phi \cdot \mu}, \tag{2}$$

wherein X is the wavefront length of the fluid, K is the fiber permeability of the measured fibrous fabric 150, t is a flowing time of the fluid, $P_0$ is the perfusing pressure of the fluid, and $\mu$ is the viscosity of the fluid.

In detail, according to the embodiment of FIG. 1, the upper plate 111 is made of the insulating material, so that a capacitance of the upper plate 111 must be considered. However, since the lower plate 112 is made of the metal material, so that a capacitance of the insulating layer 170 in the middle can be ignored. Hence, the capacitance is divided into an area of the upper plate 111 and an area of the measured fibrous fabric 150, wherein a capacitor connection between the area of the upper plate 111 and the area of the measured fibrous fabric 150 is a series connection, as the following formula (3):

$$\frac{1}{C_t} = \sum_{i=1}^{n} \frac{1}{C_i} = \frac{1}{C_a} + \frac{1}{C_f}, \tag{3}$$

wherein $C_t$ is a total capacitance, $C_a$ is the capacitance of the area of the upper plate 111, and $C_f$ is a capacitance of the area of the measured fibrous fabric 150. The capacitance of the area of the upper plate 111 is defined as the following formula (4):

$$C_a = \varepsilon_a \frac{A}{D}, \quad (4)$$

wherein $\varepsilon_a$ is a dielectric constant of the area of the upper plate 111, A is an area of the area of the upper plate 111, and D is a width of the area of the upper plate 111. Then, a capacitance of the measured fibrous fabric 150 is defined. In FIG. 2, the measured fibrous fabric 150 can be divided into the perfused area 151 and the unperfused area 152, and a capacitor connection between the perfused area 151 and the unperfused area 152 is a parallel connection, so that a capacitance of the perfused area 151 and a capacitance of the unperfused area 152 are additive, as the following formula (5):

$$C_f = C_1 + C_2 \quad (5),$$

wherein $C_1$ is the capacitance of the perfused area 151, and $C_2$ is the capacitance of the unperfused area 152. A relationship of a mixed dielectric constant proposed via Lichtenecker is organized as the following formula (6), and the formula (7) and formula (8) are defined via the formula (6):

$$\varepsilon_{f1}{}^{V}f1 = \Sigma_{f2}{}^{V}f2 = \varepsilon_f{}^{V}f \quad (6),$$

$$V_v + V_r = 1 \quad (7),$$

$$\varepsilon_a = 1 \quad (8),$$

wherein V is a volume percentage, f1 is a part of the perfused area 151, and f2 is a part of the unperfused area 152. $V_{f1}$ is a volume percentage of the perfused area 151, $V_{f2}$ is a volume percentage of the unperfused area 152, $V_f$ is a volume percentage of the area of the measured fibrous fabric 150, $V_r$ is a volume percentage of an area of the fluid, wherein the sum of the volume percentage of the area of the perfused area 151 and the volume percentage of the area of the unperfused area 152 is 1, and the dielectric constant of the upper plate 111 is defined as 1. Therefore, the capacitance of the area of the measured fibrous fabric 150 can be formulated as the following formula (9):

$$C_f = \frac{a \cdot \varepsilon_f^{V_f} \cdot (\varepsilon_r^{1-V_f} - 1)}{d} x + \frac{a \cdot L \cdot \varepsilon_f^{V_f}}{d}, \quad (9)$$

wherein a is the width of the conducting plate 160, $\varepsilon_r$ is the dielectric constant of the area of the fluid, L is the length of the accommodating space 114, f is a part of the measured fibrous fabric 150, and d is the thickness of the accommodating space 114. Furthermore, the formulas (4) and (9) can be substituted into the formula (3) as the following formula (10):

$$\frac{1}{Ct} = \frac{1}{\varepsilon_a \cdot \frac{aL}{D}} + \frac{1}{\frac{a \cdot \varepsilon_f^{V_f} \cdot (\varepsilon_r^{1-V_f} - 1)}{d} X + \frac{a \cdot L \cdot \varepsilon_f^{V_f}}{d}}, \quad (10)$$

the formula (2) is substituted into the wavefront length of the fluid X of the formula (10) as the following formula (11):

$$\frac{1}{Ct} = \frac{1}{\varepsilon_a \cdot \frac{aL}{D}} + \frac{1}{\frac{a \cdot \varepsilon_f^{V_f} \cdot (\varepsilon_r^{1-V_f} - 1)}{d} \sqrt{\frac{2K \cdot P_0 \cdot t}{\phi \cdot \mu}} + \frac{a \cdot L \cdot \varepsilon_f^{V_f}}{d}}, \quad (11)$$

the constants are simplified to form a shifting-order function as the following formula (12):

$$Ct = \frac{b_1 \sqrt{t} + b_2}{b_3(b_1 \sqrt{t} + b_2) + 1}, \quad (12)$$

wherein $b_1$ is defined as the formula (13), $b_2$ is defined as the formula (14), and $b_3$ is defined as the formula (15):

$$b_1 = \frac{a \cdot \varepsilon_f^{V_f} \cdot (\varepsilon_r^{1-V_f} - 1)}{d} \cdot \sqrt{\frac{2KP_0}{\mu\phi}}, \quad (13)$$

$$b_2 = \frac{a \cdot L \cdot \varepsilon_f^{V_f}}{d}, \quad (14)$$

$$b_3 = \frac{1}{\varepsilon_a \cdot \frac{a \cdot L}{D}}. \quad (15)$$

In conclusion, a relationship of the total capacitance to the time is obtained by the shifting-order function combined with Darcy's law, and $b_1$, $b_2$ and $b_3$ can be derived by the data substituted into MATLAB software with nonlinear regression, wherein the permeability can be derived by $b_1$. The conversion can be executed via the permeability converting device 140.

Figure 3:
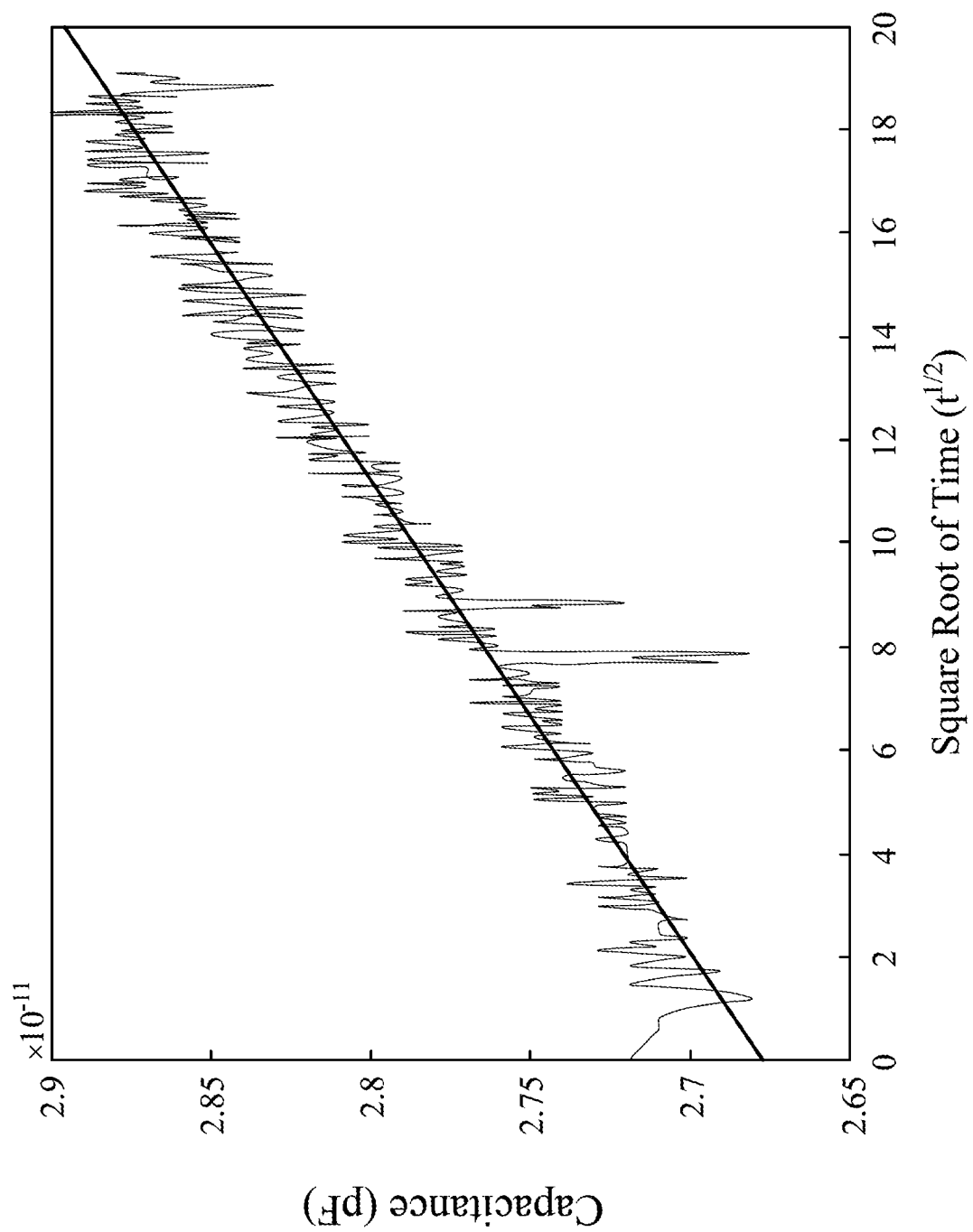
FIG. 3 is a measurement result of capacitance to square root of time (Vi) measured via the non-contact fiber permeability measurement system according to the embodiment of FIG. 1.

FIG. 3 shows a measurement result of capacitance to square root of time) ($\sqrt{t}$) measured via the non-contact fiber permeability measurement system 100 according to the embodiment of FIG. 1, and the measurement result is obtained via MATLAB software. According to the embodiment of FIGS. 1 and 2 and the shifting-order function derived as above, the measurement result of capacitance to square root of time according to the embodiment of FIG. 3 can be obtained after practical application. The measurement result of capacitance to square root of time is regressed to obtain a coefficient of determination of R-squared, and a value of R-square is 0.935. The result of the value of R-square closed to 1 represents the relationship of capacitance to square root of time closed to linear. Therefore, the effect of estimating the parameters of the process of resin transfer molding can be achieved. Moreover, the conductive fiber, such as the carbon fiber, can be used as a material of the measured fibrous fabric 150, and the conventional application limitation is conquered.

Figure 4:
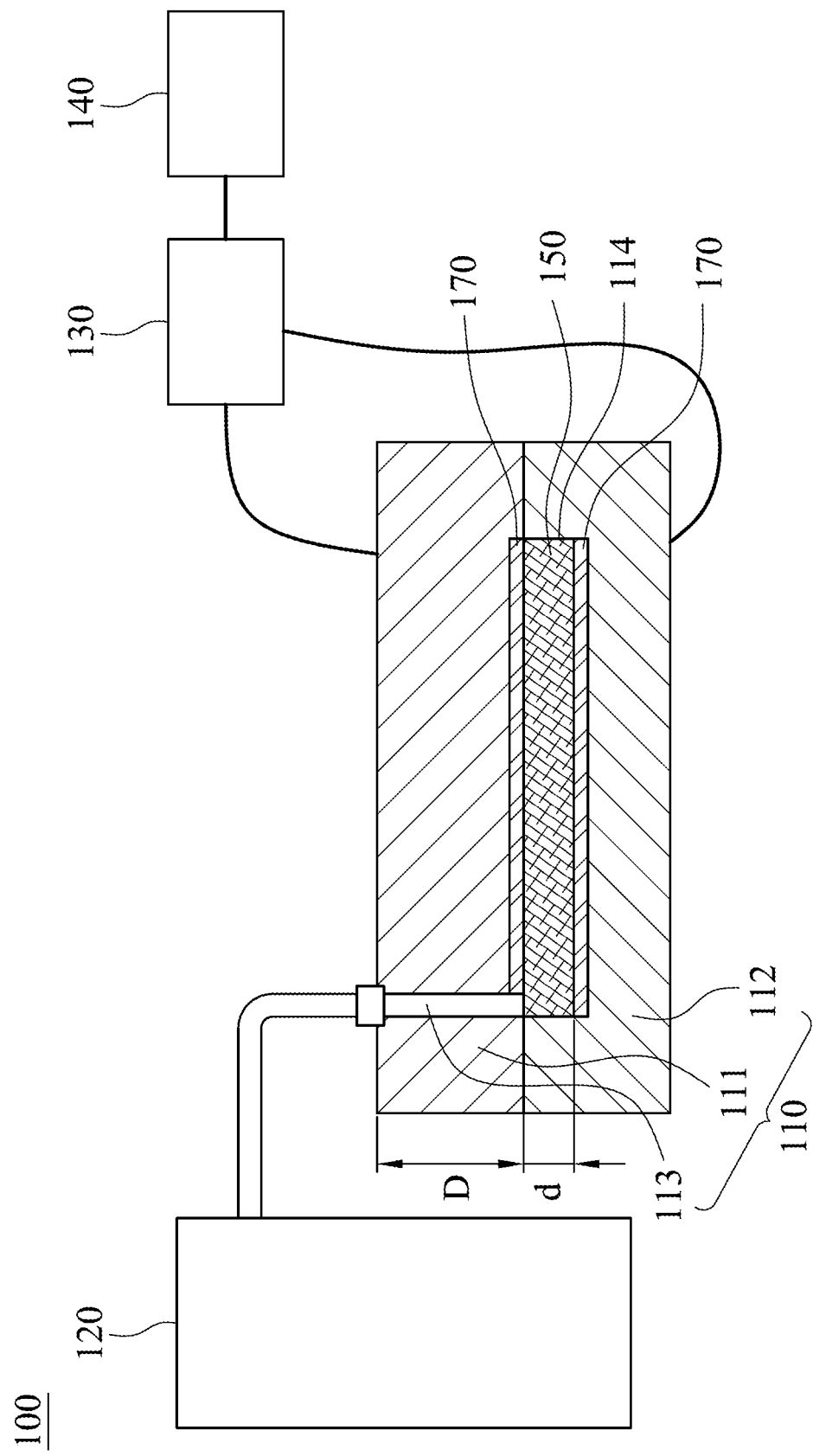
FIG. 4 is a disposition schematic view of a non-contact fiber permeability measurement system according to another embodiment of the present disclosure.

FIG. 4 shows a disposition schematic view of a non-contact fiber permeability measurement system 100 according to another embodiment of the present disclosure. The non-contact fiber permeability measurement system 100 includes a mold device 110, a fluid supplying device 120, a capacitance detecting device 130 and a permeability converting device 140. The mold device 110 includes an upper plate 111, a lower plate 112 and a fluid inlet 113. The lower plate 112 is parallel to and disposed below the upper plate 111 for forming an accommodating space 114, wherein the accommodating space 114 is for disposing a measured fibrous fabric 150, and the measured fibrous fabric 150 is insulated against the upper plate 111 and the lower plate 112. The upper plate 111 has a thickness of the upper plate D, and the accommodating space 114 has a thickness of the accommodating space d. The fluid inlet 113 is disposed through the upper plate 111. The fluid supplying device 120 is connected to the mold device 110 and for providing a fluid to be perfused from the fluid inlet 113 into the accommodating space 114. The capacitance detecting device 130 is electrically connected to an outer surface of the upper plate 111 and an outer surface of the lower plate 112 and for detecting a capacitance of the accommodating space 114. The elements and arrangement according to the embodiment of FIG. 4 which are the same as the disclosure in the embodiment of FIG. 1 will not be described again herein.

Furthermore, the upper plate 111 and the lower plate 112 according to the embodiment of FIG. 4 are made of metal materials. Each of a side of the upper plate 111 made of the metal material toward the accommodating space 114 and a side of the lower plate 112 made of the metal material toward the accommodating space 114 can include an insulating layer 170 to obtain the insulating effect. In FIG. 4, the insulating layer 170 can be an insulating membrane. Moreover, the upper plate 111 and the lower plate 112 are made of the metal materials, so that the upper plate 111 and the lower plate 112 can be electrically connected to the capacitance detecting device 130 without further conducting plate. In FIG. 4, the upper plate 111 is not made of a transparent material, so that a perfusing condition cannot be directly observed as the embodiment of FIG. 1. However, the capacitance can be obtained by the measurement of the capacitance detecting device 130, and the capacitance can be converted to the permeability via the permeability converting device 140. Therefore, materials of the upper plate 111 and the lower plate 112 are not limited, so that the non-contact fiber permeability measurement system 100 is more widely used than the conventional contact fiber permeability measurement system.

Figure 5:
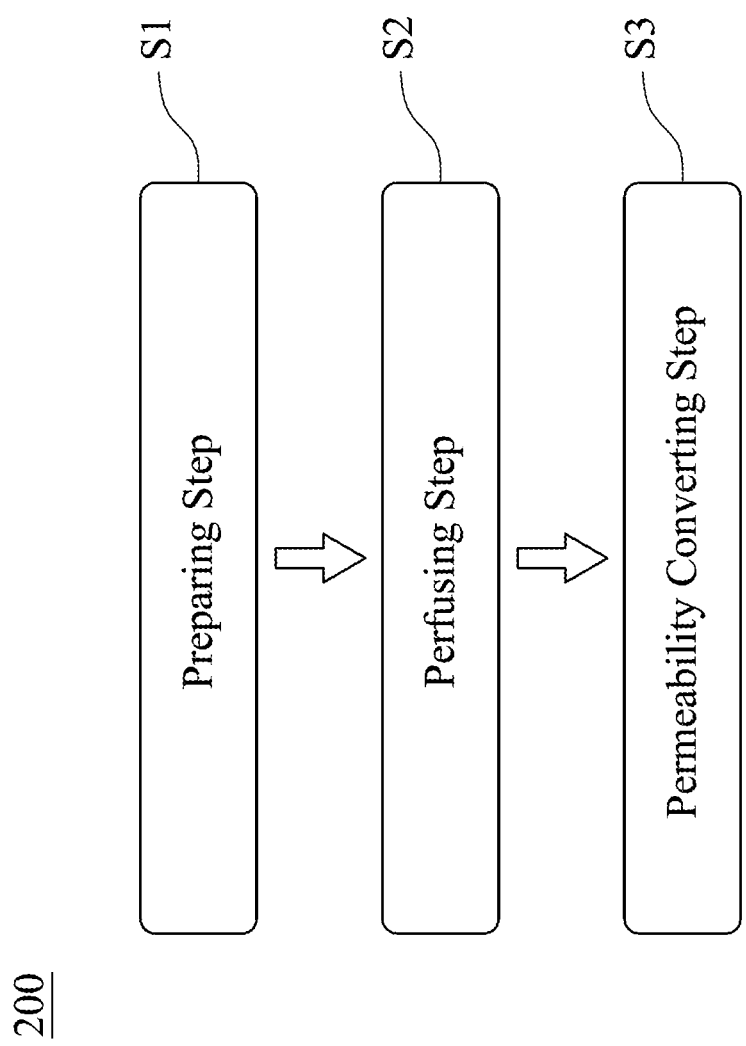
FIG. 5 is a process schematic view of a non-contact fiber permeability measurement method according to another embodiment of the present disclosure.

FIG. 5 shows a process schematic view of a non-contact fiber permeability measurement method 200 according to another embodiment of the present disclosure. The non-contact fiber permeability measurement method 200 can be used via the non-contact fiber permeability measurement system 100 according to the embodiment of FIG. 1, but is not limited thereto. The non-contact fiber permeability measurement method 200 includes a preparing step S1, a perfusing step S2 and a permeability converting step S3. In the preparing step S1, a measured fibrous fabric 150 is disposed in an accommodating space 114 formed between an upper plate 111 and a lower plate 112, and the measured fibrous fabric 150 is insulated against the upper plate 111 and the lower plate 112, respectively. In the perfusing step S2, a fluid is perfused into the accommodating space 114, and a capacitance of the fluid is detected via a capacitance detecting device 130 electrically connected to an outer surface of the upper plate 111 and an outer surface of the lower plate 112. In the permeability converting step S3, the capacitance is received from the perfusing step S2 and the capacitance is converted to a permeability via a permeability converting device 140.

Furthermore, in the preparing step S1, the measured fibrous fabric 150 is cut into a same length as a length of the conducting plate 160, so that the length of the measured fibrous fabric 150 is the same as the length of the accommodating space L, and the measured fibrous fabric 150 is disposed in the accommodating space 114. In the perfusing step S2, the fluid whose viscosity is known is perfused into the accommodating space 114, and the capacitance and a flowing time are detected via a measurement software of the capacitance detecting device 130. The measurement software, such as LabVIEW software, can be used to record the capacitance read every second. In the permeability converting step S3, the capacitance detected via the capacitance detecting device 130 is substituted into an analysis software of the permeability converting device 140 to calculate and nonlinear analyze. The permeability can be analyzed to obtain a detecting module to suppose the condition of the fluid perfused.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A non-contact fiber permeability measurement system, comprising:
   a mold device, comprising:
      an upper plate;
      a lower plate, the lower plate parallel to and disposed below the upper plate for forming an accommodating space, wherein the accommodating space is for disposing a measured fibrous fabric, and the measured fibrous fabric is insulated against the upper plate and the lower plate; and
      a fluid inlet disposed through the upper plate;
   a fluid supplying device connected to the mold device and for providing a fluid to be perfused from the fluid inlet into the accommodating space;
   a capacitance detecting device electrically connected to an outer surface of the upper plate and an outer surface of the lower plate and for detecting a capacitance between the upper plate and the lower plate forming the accommodating space; and
   a permeability converting device electrically connected to the capacitance detecting device and for receiving the capacitance to convert the capacitance to a permeability of a fibrous fabric with respect to the fluid;
   wherein the capacitance is converted to the permeability via a shifting-order function, the shifting-order function is $$Ct = \frac{b_1\sqrt{t} + b_2}{b_3(b_1\sqrt{t} + b_2) + 1},$$

C is the capacitance, and t is a flowing time of the fluid:
   wherein $b_1$ of the shifting-order function is $$b_1 = \frac{a \cdot \varepsilon_f^{V_f} \cdot (\varepsilon_r^{1-V_f} - 1)}{d} \cdot \sqrt{\frac{2KP_0}{\mu\phi}},$$

a is a conducting plate width, £ is a dielectric constant, f represents the measured fibrous fabric, V is a volume percentage, r represents the fluid, d is a thickness of the accommodating space, K is a fiber permeability of the measured fibrous fabric, $P_0$ is a perfusing pressure of the fluid, µ is a viscosity of the fluid, and ϕ is a fiber porosity of the measured fibrous fabric;

wherein $b_2$ of the shifting-order function is $$b_2 = \frac{a \cdot L \cdot \varepsilon_f^{V_f}}{d},$$

and L is a length of the accommodating space;
wherein $b_3$ of the shifting-order function is $$b_3 = \frac{1}{\varepsilon_a \cdot \frac{a \cdot L}{D}},$$

£ is a dielectric constant of an area of the upper plate, and D is a width of the area of the upper plate.

2. The non-contact fiber permeability measurement system of claim 1, wherein at least one of the upper plate and the lower plate is made of a metal material, and the at least one of the upper plate and the lower plate made of the metal material further comprises an insulating layer, and the at least one of the upper plate and the lower plate made of the metal material is insulated against the measured fibrous fabric via the insulating layer.

3. The non-contact fiber permeability measurement system of claim 2, wherein the insulating layer is an insulating plate disposed on a side of the at least one of the upper plate and the lower plate made of the metal material toward the accommodating space.

4. The non-contact fiber permeability measurement system of claim 3, wherein the insulating plate is made of a plastic material.

5. The non-contact fiber permeability measurement system of claim 2, wherein the insulating layer is an insulating membrane formed on a side of the at least one of the upper plate and the lower plate made of the metal material toward the accommodating space.

6. The non-contact fiber permeability measurement system of claim 5, wherein the insulating membrane is made of a plastic material.

7. The non-contact fiber permeability measurement system of claim 1, wherein at least one of the upper plate and the lower plate is made of an insulating material, and the at least one of the upper plate and the lower plate made of the insulating material further comprises a conducting plate electrically connected to the capacitance detecting device.

8. The non-contact fiber permeability measurement system of claim 7, wherein the conducting plate is a copper plate.

9. The non-contact fiber permeability measurement system of claim 1, wherein the measured fibrous fabric is a carbon fiber or a glass fiber.

10. The non-contact fiber permeability measurement system of claim 1, wherein the fluid is a resin.

11. The non-contact fiber permeability measurement system of claim 1, wherein the permeability converting device comprises an analysis software for converting the capacitance to the permeability.

12. The non-contact fiber permeability measurement system of claim 1, wherein the fluid inlet is connected to a side of the accommodating space, and the fluid inlet is for the fluid being perfused from the side of the accommodating space into the other side of the accommodating space.

13. A non-contact fiber permeability measurement method, comprising:
a preparing step, wherein a measured fibrous fabric is disposed in an accommodating space formed between an upper plate and a lower plate, and the measured fibrous fabric is insulated against the upper plate and the lower plate, respectively;
a perfusing step, wherein a fluid is perfused into the accommodating space;
a detecting step, wherein a capacitance between the upper plate and the lower plate forming the accommodating space is detected via a capacitance detecting device electrically connected to an outer surface of the upper plate and an outer surface of the lower plate; and
a permeability converting step, wherein the capacitance is received from the detecting step and the capacitance is converted, via a permeability converting device, to a permeability of a fibrous fabric with respect to the fluid;
wherein the capacitance is converted to the permeability via a shifting-order function, the shifting-order function is $$Ct = \frac{b_1 \sqrt{t} + b_2}{b_3(b_1 \sqrt{t} + b_2) + 1},$$

C is the capacitance, and t is a flowing time of the fluid;
wherein $b_1$ of the shifting-order function is $$b_1 = \frac{a \cdot \varepsilon_f^{V_f} \cdot (\varepsilon_r^{1-V_f} - 1)}{d} \cdot \sqrt{\frac{2KP_0}{\mu \phi}},$$

a is a conducting plate width, £ is a dielectric constant, f represents the measured fibrous fabric, V is a volume percentage, r represents the fluid, d is a thickness of the accommodating space, K is a fiber permeability of the measured fibrous fabric, $P_0$ is a perfusing pressure of the fluid, µ is a viscosity of the fluid, and φ is a fiber porosity of the measured fibrous fabric;
wherein $b_2$ of the shifting-order function is $$b_2 = \frac{a \cdot L \cdot \varepsilon_f^{V_f}}{d},$$

and L is a length of the accommodating space;
wherein $b_3$ of the shifting-order function is $$b_3 = \frac{1}{\varepsilon_a \cdot \frac{a \cdot L}{D}},$$

£ is a dielectric constant of an area of the upper plate, and D is a width of the area of the upper plate.

* * * * *